United States Patent
Rossius et al.

[11] Patent Number: 5,721,552
[45] Date of Patent: Feb. 24, 1998

[54] TRANSPONDER WITH AGC REGULATOR

[75] Inventors: Hans-Ulrich Rossius, Harsum; Michael Ohler, Despetal; Friedrich-Wilhelm Bode, Apelern; Andreas Vahle; Hans-Jürgen Fischer, both of Hildesheim, all of Germany

[73] Assignee: Robert Bosch GmbH, Stuttgart, Germany

[21] Appl. No.: 605,187

[22] PCT Filed: Sep. 28, 1994

[86] PCT No.: PCT/DE94/01141

§ 371 Date: May 31, 1996

§ 102(e) Date: May 31, 1996

[87] PCT Pub. No.: WO95/10096

PCT Pub. Date: Apr. 13, 1995

[30] Foreign Application Priority Data

May 10, 1993 [DE] Germany ............ 43 33 964.6

[51] Int. Cl.⁶ .................................................. G01S 13/76
[52] U.S. Cl. .................. 342/51; 340/928; 455/132; 455/54.1; 455/272; 375/267; 375/259
[58] Field of Search ............................ 342/51; 340/928, 340/904, 905; 375/267, 259; 455/132, 54.1, 272

[56] References Cited

U.S. PATENT DOCUMENTS

| 5,444,742 | 8/1995 | Grabow et al. | 375/267 |
| 5,459,469 | 10/1995 | Schuchman et al. | 342/37 |
| 5,537,672 | 7/1996 | Grabow et al. | 455/132 |

OTHER PUBLICATIONS

"Advanced Telematics in Road Transport", Proceedings of DRIVE Conference, Feb. 4–6, 1991, pp. 248–268.

Primary Examiner—John B. Sotomayor
Attorney, Agent, or Firm—Kenyon & Kenyon

[57] ABSTRACT

For the digital data communication between a vehicle (transponder) and a beacon, an automatic gain control wherein the path attenuation between the transponder and the brake increases disproportionately with the distance. A two-stage automatic gain control is included for the gain control. After the first amplifier stage, the output signal is measured and supplied, together with a setpoint value contained in a setpoint memory, to a control amplifier. The output signal of the control amplifier is used both for automatically controlling the first amplifier stage, as well as the second amplifier stage. The automatic control makes it possible to cover only one single lane when automatically debiting highway tolls for a motor vehicle, for example. Influences caused by other motor vehicles on a nearby lane are eliminated.

12 Claims, 2 Drawing Sheets

TRANSPONDER WITH AGC REGULATOR

FIELD OF THE INVENTION

The present invention relates to a transponder, preferably for the bidirectional transmission of data to a fixed station designed as a beacon.

BACKGROUND INFORMATION

A transponder for the bidirectional transmission of data between a vehicle's OBU (on-board unit) and a fixed station (beacon), which works in accordance with the semipassive transponder method, is already disclosed by the publication *Proceedings of the DRIVE Conference*, February 4–6, 1991, "Advanced Telematics in Road Transport" (pp. 248–268). However, the problem occurs that the range of the beacon's reception coverage, for example, is not able to be restricted precisely enough to one single lane (on the road), so that in an automatic toll ticketing (collection) application, it can happen that the OBU of a vehicle driving in a nearby lane so greatly disturbs the communication of the vehicle driving under the antenna that the tolls are not properly debited.

SUMMARY OF THE INVENTION

In contrast, the advantage of the transponder according to the present invention is that through the automatic feedback control of the signal that is retransmitted (sent back) to the beacon, the attenuation of the signal is so conceived that only a strictly limited range is provided for the signal level arriving at the beacon. The attenuation is so controlled in this case that the attenuation of the signal both from the beacon to the vehicle, as well as in the opposite direction is compensated and, as a result, possible interference from nearby lane areas is suppressed. OBUs situated in the nearby lane are limited accordingly out of the corresponding antenna because of their higher useful signal level and can no longer interfere.

It is also advantageous according to the present invention that the downlink signal is controlled by a first automatically controllable amplifier stage (automatic gain control, AGC). There follows, as a result, a first measurement of the level received. For example, the level can vary due to a dirty (window) pane or because of other influences. The level is measured to find a controlled variable with reference to a setpoint value and to use it as a basis for the automatic (feedback) control.

Another advantage of an embodiment according to the present invention is that the variable found in the first measurement is fed for control purposes to another amplifier stage, which amplifies or attenuates the UPLINK signal with the same factor and the retransmits it to the beacon.

In exemplary applications, the advantageous results according to the present invention are attained when allocating the reception range coverage of a beacon to one lane that only one vehicle is covered by the beacon at a time. As a result, when the transponder is mounted on a motor vehicle, one single vehicle can be covered. This is especially advantageous for the automatic debiting of highway tolls or for checking if vehicles have authorized access.

DETAILED DESCRIPTION OF THE INVENTION

Figure 1:
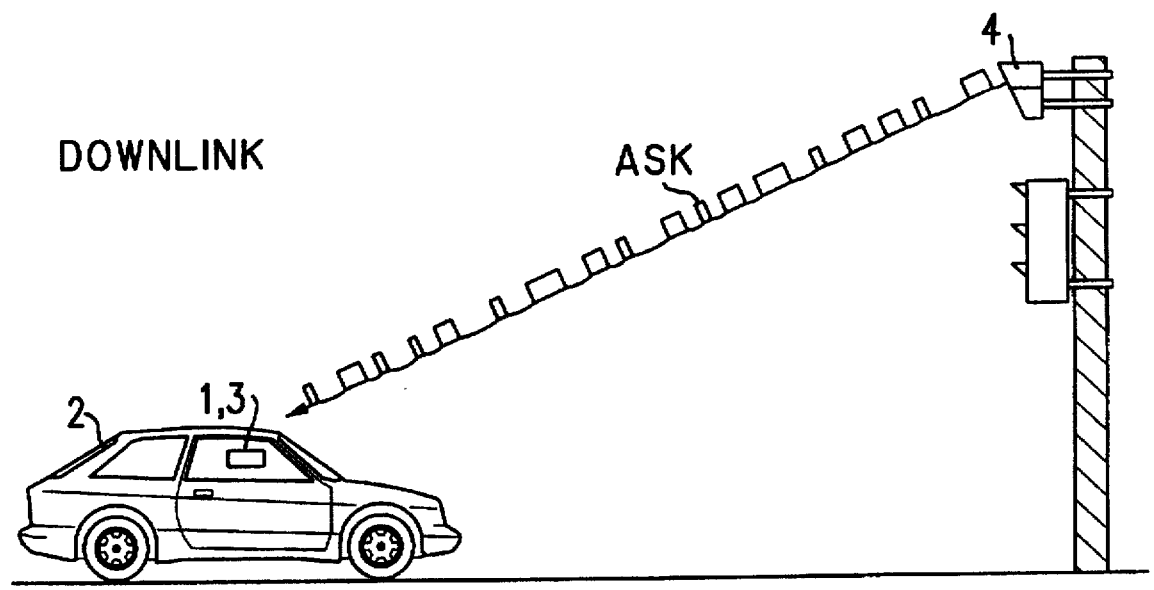
FIG. 1 shows a schematic illustration of the transmit mode in DOWNLINK according to the present invention.

FIG. 1 depicts a motor vehicle 2, which is equipped with an (OBU) "on-board unit" or digital communication with a beacon 4. The OBU 1 works as a transponder 3 and receives the amplitude-modulated signals ASK of the beacon 4 in DOWNLINK.

The transponder 3, as well as the beacon 4 are known from the previously mentioned publication and, therefore, require no further clarification. The transponder 3 has a receiving antenna for receiving data signals and a transmitting antenna 1 for transmitting data signals. When microwaves are used, the antennas 1 constitute a part of the transponder.

Figure 2:
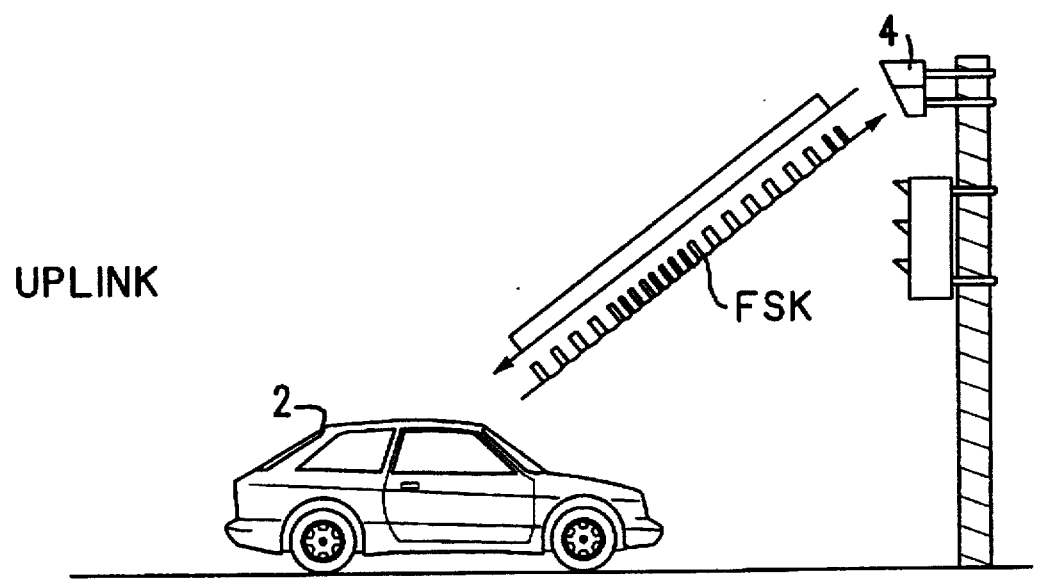
FIG. 2 shows a schematic illustration of the transmit mode in UPLINK according to the present invention.
Figure 4:
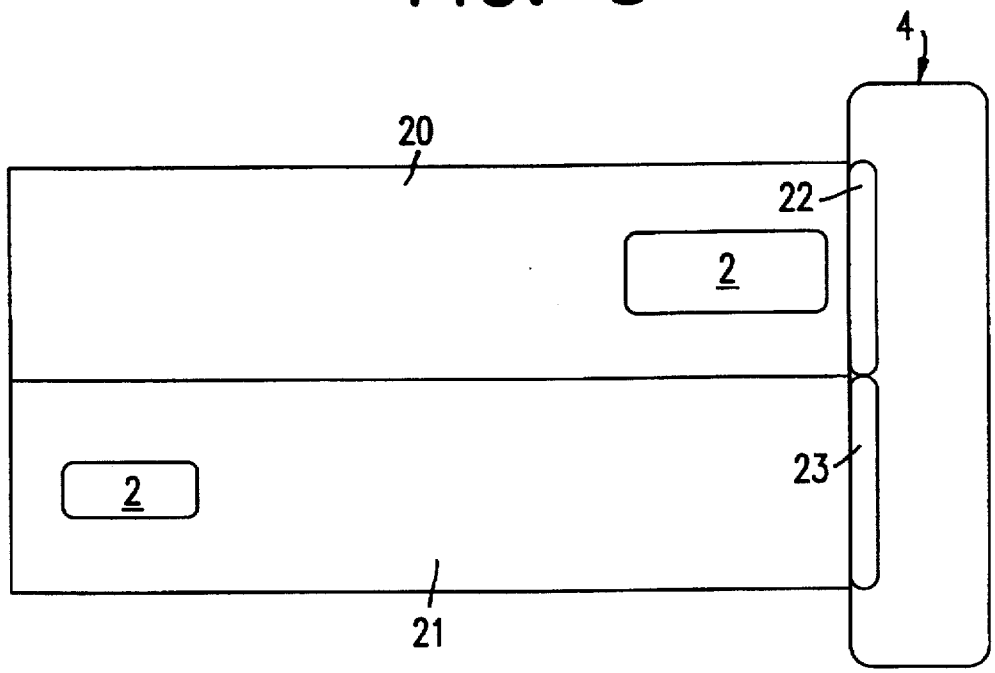
FIG. 4 illustrates an example of transition of signals in multiple lanes on a road according to the present invention.

FIG. 2 depicts the digital communication in UPLINK, the transponder 3 (as shown in FIG. 1) initially generating its line voltage from the unmodulated signal of the beacon 4 and then transferring its data to be transmitted in FSK modulation (frequency shift keying) to the beacon 4. When working with the passive, per se known transponder method, the disadvantage results that the UPLINK transmit energy is dependent upon the attenuation on the transmission path. This is elucidated on the basis of the example of FIG. 4. In FIG. 4, two lanes 20, 21 are shown, on which a first motor vehicle 2 or a second motor vehicle 2 is being driven. A beacon 4 with antennas 22, 23 is mounted on a gantry (overhead sign) spanning the lanes. The antennas are so arranged that they are able to cover the indicated lane area 20 or 21. Now, it is so that the antenna 22 also covers the lane area 21 and, conversely, the antenna 23 covers the lane area 20, although with very low power (aerial) gain. In addition, the problem arises that the path attenuation between the beacon 4 and the transponder 3 (as shown in FIG. 1) is dependent upon various factors. An example is when the first motor vehicle is situated close to the antenna 22, and the second motor vehicle is further away from the antenna 23. It can happen that, as a truck (or a commercial vehicle), the first motor vehicle has a high type of construction and that, as a passenger vehicle, the second motor vehicle has a low type of construction. Also in this example, the first motor vehicle has a clean windowpane, behind which the transponder 3 is situated, while the second motor vehicle has dirty windowpanes. As a result of these factors, the path attenuation between the beacon 4 and the first vehicle 2 is considerably lower than in the case of the second vehicle. Because of the low path attenuation of the first motor vehicle 2, the antenna 3 is also able to receive its signals.

Figure 3:
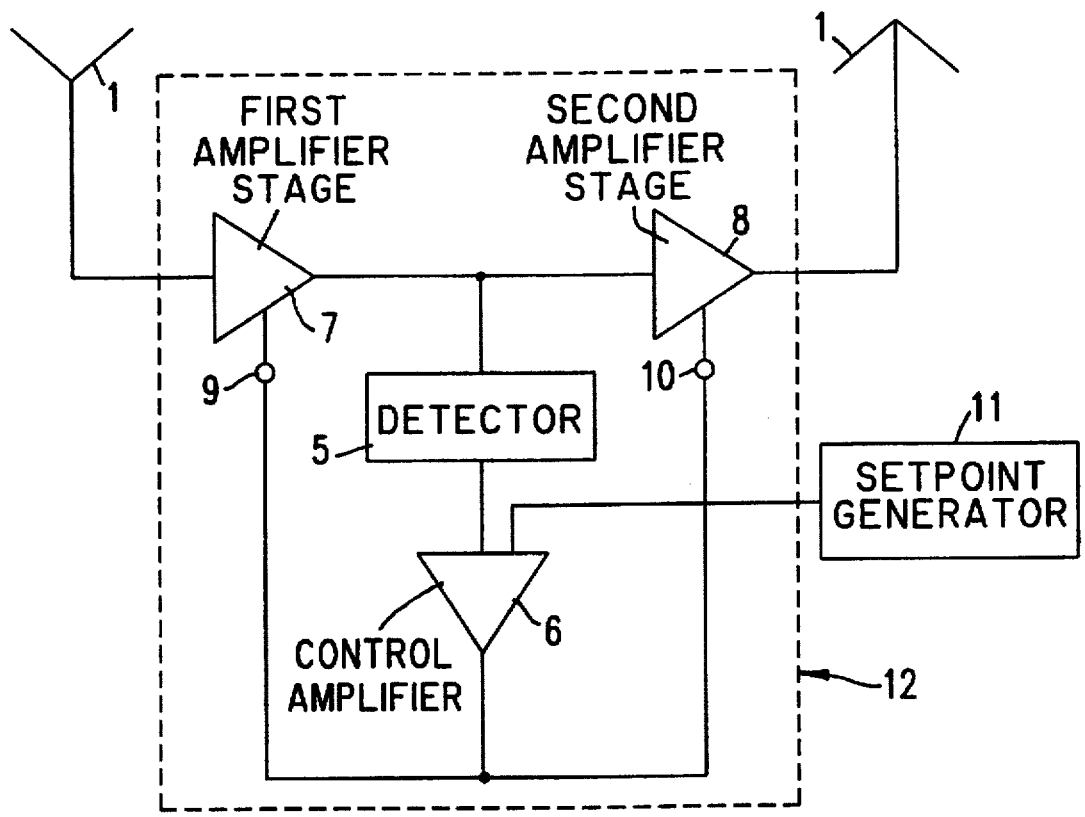
FIG. 3 illustrates a block diagram of an embodiment according to the present invention.

To eliminate these shortcomings, in accordance with FIG. 3, the present invention proposes introducing means for a gain control 12 (automatic gain control, AGC) between the receiving and transmitting antenna 1. A first improvement in the feedback control is already achieved by keeping the output signal from the transponder 3 (shown in FIG. 1) constant with the aid of a first, automatic gain control 7. This signal that is kept constant and has a predetermined output level can then be retransmitted to the beacon 4 (as shown in FIGS. 1, 2 and 4).

A still further improved control of the output signal according to the present invention is obtained, as illustrated in FIG. 3, by connecting a second amplifier stage 8 in series with the first amplifier stage 7 and by connecting its output to the transmitting antenna 1. For this purpose, the amplifier control 12 has a detector 5, which detects the amplitude of the first amplifier stage 7. This signal is transmitted to a control amplifier 6, which extracts its reference value from a setpoint generator 11. The setpoint generator 11 is designed as a memory device. Now, on the basis of the predetermined setpoint values and the detector signal, the control amplifier 6 automatically controls its output gain and transmits a corresponding controlled value into corresponding control inputs 9, 10 of the first and second amplifier stage.

The advantage of the feedback control method according to the present invention consists in that, for example, a gain measurement is only required at the first amplification stage and can be easily carried out with the detector 5. An appropriate diode circuit is suited as a detector. Commercially available semiconductor controllers can be used as control amplifiers 6. However, the control characteristic of the first and second amplifier stage 7, 8 should conform to the greatest extent possible. The effect of this double gain control is that the output signal from the transponder 3 to the beacon 4 also compensates for the attenuation fluctuations of the UPLINK. Thus, the path attenuations of the DOWN and UPLINK are compensated through the double gain control of the transponder 3. The final outcome of this is that a vehicle in a neighboring lane which is further away than the beacon's own lane is no longer able to interfere. Therefore, a toll can be debited for the desired lane without any interference and, thus, reliably.

We claim:

1. A transponder for transmitting data to a fixed station via a passive transponder method, the transponder including a receiving antenna and a transmitting antenna, the transponder comprising:

a first automatically controllable amplifier connected in series with a second automatically controllable amplifier, the first and the second amplifiers each being switchably coupled between the receiving antenna and the transmitting antenna, the first amplifier having a first output signal;

a generator providing at least one predetermined setpoint value;

a control amplifier coupled to the generator to receive the at least one predetermined setpoint value, the control amplifier also being coupled to the first amplifier and generating a control value as a function of the first output signal of the first amplifier and the at least one predetermined setpoint value; and wherein an amplification of the first amplifier is controlled as a function of the control value, the control value also being provided to the second amplifier.

2. The transponder as recited in claim 1, wherein the data is bidirectionally transmitted to the fixed station, the fixed station including a beacon.

3. The transponder as recited in claim 1, wherein the first and the second amplifiers each have a substantially conforming control characteristic.

4. The transponder as recited in claim 1, wherein the generator includes a memory unit for storing the at least one setpoint value.

5. The transponder as recited in claim 1, wherein the first amplifier includes a first control input and the second amplifier includes a second control input, the first and second amplifiers each being controllable via the respective first and second control inputs.

6. The transponder as recited in claim 1, wherein the first and the second amplifiers each have a respective attenuation characteristic.

7. The transponder as recited in claim 6, wherein a second output signal of the second amplifier has a path attenuation that quadratically increases as a function of an amplitude of a first control input of the first amplifier, the respective attenuation characteristics of the first and second amplifiers being controllable.

8. The transponder as recited in claim 1, wherein the second output is coupled to the transmitting antenna.

9. The transponder as recited in claim 1, wherein the first and second amplifiers are mounted on a motor vehicle.

10. The transponder as recited in claim 1, wherein the receiving and transmitting antennas communicate with a toll debiting system.

11. The transponder as recited in claim 1, wherein the receiving and transmitting antennas communicate with a traffic control system.

12. A transponder for transmitting data to a fixed station via a passive transponder method, the transponder having a receiving antenna and a transmitting antenna, the transponder comprising:

a first automatically controllable amplifier connected in series with a second controllable amplifier, the first and the second amplifiers each being coupled between the receiving antenna and the transmitting antenna, the first amplifier having a first input and a first output, the second amplifier having a second input and a second output, the second output being coupled to the transmitting antenna;

a generator for providing at least one predetermined setpoint value;

a control amplifier coupled to the generator to receive the at least one predetermined setpoint value, the control amplifier also being coupled to the first input of the first amplifier and generating a control value as a function of a first output signal of the first output and the at least one predetermined setpoint value; and wherein the amplification of the first amplifier is controlled as a function of the control value, the control value also being provided to the second input of the second amplifier.

* * * * *

UNITED STATES PATENT AND TRADEMARK OFFICE
CERTIFICATE OF CORRECTION

PATENT NO. : 5,721,552
DATED : February 24, 1998
INVENTOR(S) : Hans-Ulrich Rossius, Michael Ohler, Friedrich-Wilhelm Bode, Andreas Vahle, Hans-Jürgen Fischer It is certified that error appears in the above-identified patent and that said Letters Patent is hereby corrected as shown below:

Column 1, line 10, "vehicle's" should be --motor vehicle's--;

Column 2, line 7, "or" should be --for--; and

Column 3, line 17, after "the" insert --(automatic)--.

Signed and Sealed this

Tenth Day of August, 1999

Attest:

Q. TODD DICKINSON

Attesting Officer

Acting Commissioner of Patents and Trademarks